United States Patent [19]
Anello et al.

[11] Patent Number: 5,509,057
[45] Date of Patent: Apr. 16, 1996

[54] TELEPHONE BODY GUARD ARMOR

[75] Inventors: Salvatore Anello, Highland; Albert F. Diaz, Lynbrook; Nathan M. Turk, Highland, all of N.Y.

[73] Assignee: Sandt Technology, Ltd., Marlboro, N.Y.

[21] Appl. No.: 231,501

[22] Filed: Apr. 22, 1994

[51] Int. Cl.[6] .......................... H04M 17/00; H04M 3/00; H04M 1/00; H04M 9/00

[52] U.S. Cl. .......................... 379/145; 379/143; 379/150; 379/155; 379/368; 379/369; 379/428; 379/437; 379/451

[58] Field of Search .................................. 379/143, 145, 379/150, 155, 428, 437, 451, 453, 368, 369

[56] References Cited

U.S. PATENT DOCUMENTS

| | | | |
|---|---|---|---|
| 4,160,136 | 7/1979 | McGough | 379/368 |
| 4,645,876 | 2/1987 | Albertson | 379/155 |
| 5,054,056 | 10/1991 | Blythe | 379/145 |
| 5,130,629 | 7/1992 | Kuhfus | 379/369 |
| 5,133,528 | 7/1992 | Vogl | 379/437 |
| 5,134,654 | 7/1992 | McGough | 379/451 |
| 5,148,476 | 9/1992 | Zausnes | 379/143 |
| 5,155,765 | 10/1992 | McGough | 379/437 |

*Primary Examiner*—Stephen Chin
*Assistant Examiner*—Vijay Shankar
*Attorney, Agent, or Firm*—Joseph B. Taphorn

[57] ABSTRACT

A telephone is secured against vandalism by a double layer face plate or assemblage of tough materials. The assemblage consists of an outer plate covering most of the front of a telephone upper housing or casing, and a second layer covering the housing casing in areas not covered by the outer layer. Two such areas are those which involve openings in the outer or first layer for mounting the standard information pads above and below the dial push buttons. The second layer is open in the area of the push buttons, but the outer layer is provided with a grid thereat for preventing the housing or casing pushbutton grid from being pried out. The outer plate may be provided with wings to also secure the sides and top of the housing or casing against drilling and the insertion of a wire to pin the coin switch vane or to ground the coin switch relay to hold up deposited coins. The outer plate may also be provided with depending portions to cover the telephone coin box and coin return bucket. A horizontally extending plate at the bottom of the depending portions provides a stand for soft ground when the casing and its protection assemblage is unlocked and removed from the telephone.

21 Claims, 6 Drawing Sheets

TELEPHONE BODY GUARD ARMOR

FIELD OF THE INVENTION

This invention relates to coin-operated pay telephone security devices, and more particularly to a new security device that protects a coin-operated telephone from number of different vandalizations.

BACKGROUND OF THE INVENTION

Vandalism of coin-operated public pay telephones is one of the biggest problems facing public and private telephone companies. Pay phones are exposed day and night to professional and amateur criminals who find the significant sums of money collected therein on a continuous basis, a serious temptation. The exposed and isolated nature of pay telephone installations renders the vandalism acts relative safe for the criminal.

A pay telephone has embossed on the upper part of its upper-housing or -casing front face a twelve-hole grid for receiving and guiding its twelve dial keys. The switch pad supporting the dial keys is mounted behind the grid. Vandals rip out the existing key pad grid, punch in the switch pad, and gain inside access to the Medeco lock securing the upper casing to the pay telephone main frame. The upper housing is then removed, giving access to the hopper which normally temporarily holds deposited coins until a call is completed or found non-completable. The hopper is then removed, giving access to the coin bank and enabling removal of the coins therein.

In another form of vandalism, the would-be thief pins a coin-switch relay in closed position. The coin-switch relay is located at the bottom of the hopper and has three positions. It is normally controlled through suitable electrical wiring connecting it to a terminal pad mounted behind the switching pad and that is suitably connected to the switching pad by other electrical wiring. One of the three positions of the coin-switch relay is the normal or closed position in which it holds the deposited coins until the call is either dialed and competed or the call is not completed. If the call is completed, the relay is energized to move the switch to a second position in which the deposited coins are allowed to drop into the telephone coin box or bank. If the call is not completed, the relay is energized to move the switch to the third position in which the deposited coins are dropped into the telephone coin-return mechanism or bucket.

A pay telephone includes a coin-return mechanism or bucket to which normally a would-be caller's money is returned when a call is not completed, as when the called number is busy. Vandals have discovered that all coins deposited in a telephone, for both incompleted and completed calls, can be appropriated to themselves via the coin-return mechanism. They achieve this by pinning the coin-switch relay in closed position.

Before a regularly-scheduled telephone company coin pick-up time, the vandal returns to retrieve the coins deposited since the pinning. He first removes the pin. He then goes "off-hook", and immediately hangs up. The coin-operated telephone now work as it should, and "return current" comes out to the coin telephone from the "central office". The "return current" operates the coin-switch relay to move it to the third position in which it allows all coins in the hopper to drop under the influence of gravity to the coin return bucket. All of the coins, for both incompleted and completed calls, which were deposited during the period the coin switch relay was pinned, will now be available to the returning vandal who rifles the coin return bucket for its contents. The pin may now be reapplied, or it may be left off until after the next telephone company collection visit to allow the collection of a few coins in the telephone coin box and not alert the company to the fraud being practiced.

Thus both the unsuccessful callers and the phone company are defrauded of their rightful monies. In addition, the phone company is subjected to the ill will of unsuccessful callers who do not recover their coins.

Pinning is accomplished by drilling of the telephone upper housing or casing to extend a wire through the drilled hole to gain access to the coin-switch vane.

In a variation of this form of vandalism, vandals insert a bare electrically-conductive wire through the newly drilled hole, and touch a terminal on the rear of the terminal pad with the wire to ground the coin-switch relay to the casing as disclosed using a lock in patent application "Terminal Guard" being filed by the instant inventors concurrently herewith. The grounded relay thereupon assumes a condition in which the coin-switch is in its closed position in which it holds-up all subsequently deposited coins. Again periodically the vandal returns to retrieve the coins deposited. He first removes the ground to the terminal pad terminal. He then inserts a coin, dials a number, and immediately hangs up. The coin-operated telephone now works as it should and energizes the coin switch relay to return the vandal's coin. Only this time, not merely is the vandal's coin sent to the coin return mechanism, but also all of the coins, for both incompleted and completed calls, which were deposited during the period the coin-switch relay was grounded. The coin return mechanism is now rifled for its contents. The ground may now be reapplied, or it may be left off until after the next telephone company collection visit.

In still another form of vandalism, the telephone removable coin box wherein coins for completed calls are collected, is pried off. A suitable sharp tool, such as a screwdriver, is inserted at a juncture to overcome a lock and force the coin box out.

In yet another from of vandalism, the telephone coin-return mechanism or bucket is ripped out to make retrieval of deposited coins for calls not completed, difficult. The ripping out may be done by inserting a suitable tool, such as a crowbar or large screwdriver, into the coin-return bucket and pushing down on the crowbar outer end, using as a fulcrum the lower edge of the upper housing or casing about the bucket opening.

PRIOR ART

Efforts at preventing vandalism have included those set forth in U.S. Pat. No. 5,134,654 issued to McGough on Jul. 28, 1992 for "High Security Upper Housing Shield for Telephone Paystation", and in U.S. Pat. No. 5,148,476 issued to Zausner on Sep. 15, 1992 for "Telephone Anti-Theft Device". McGough shows an upper-housing wrap around security shield employing spacer plates for proper spacing. Zausner shows a protection cover for the telephone coin box and coin return bucket.

SUMMARY OF THE INVENTION

Accordingly, it is an object of the invention to insure that coin-operated telephones can freely operate in their expected manner.

Another object of the invention is to insure that coins for unsuccessful pay telephone calls are available to the caller for retrieval.

Still another object of the invention is to save for the telephone company the coins that rightfully belong to it.

Yet another object of the invention is to improve the earnings of telephone companies so that rates for all legitimate users may be lowered.

A more particular object of the invention is to reduce the damage that may be done to coin operated pay phones by vandalism.

A more specific object of the invention is to discourage the drilling of the coin-operated pay telephone casing by vandals.

A still more more specific object of the invention is to prevent the pinning by a vandal of the vane of the coin switch in its normal or closed position in which it holds up all deposited coins.

A related object of the invention is to prevent the electrical grounding by a vandal, via a terminal on the terminal pad, of the coin-switch relay which leaves the coin switch in its normal or closed position in which it holds up all deposited coins.

Yet another object of the invention is to reduce the parts replacement and repair costs for vandalized pay phone.

A related object of the invention is to protect the telephone company from the ill will of unsuccessful telephone callers whose coins were not returned.

A still further object of the invention is to encourage the installation of pay telephones in high crime areas.

Yet another object of the invention is to encourage the installation of pay telephones in poor or ghetto areas where individual or family phones are a rarity.

An additional object of the invention is to provide a simple and easy protection against such vandalism, and one that is inexpensive.

The objects of the invention are achieved by the creation and mounting of a specially-designed double layer face plate or assemblage for a standard coin-operated pay telephone. The double layer face plate, while permitting all normal telephone functions, renders difficult if not impossible the drilling in the upper housing or casing of a hole suitable for pinning the coin-switch vane or grounding the coin switch relay. Extending one layer of the face plate around the sides of the upper casing to form wings, also renders difficult if not impossible the drilling in the upper housing or casing of a hole suitable for more easily grounding a terminal-pad terminal electrically connected to the coin-switch relay.

Extending a portion of one layer of the face plate downwards to cover the coin box, prevents prying the coin box out of the main frame. Extending another portion of one layer of a face plate downwards over the coin-return bucket and providing it with a slot having an opening commensurate with that of the coin-return bucket but so that the inner edges of the portion overly the outer edges of the coin-return bucket, prevents ripping out of the coin-return bucket. Extending the free ends(s) of one or both of the downwardly extending portions rearwardly, provides a stand for supporting the double-face plate on soft ground when the upper housing or casing is unlocked by a telephone company repair person and removed along with the double-face plate which may be bolted or welded to it to make a unitary construction.

BRIEF DESCRIPTION OF THE DRAWINGS

These and other objects, features, and advantages of the invention will become apparent from a reading of the following description of preferred embodiments of the invention, when considered with the appended drawings wherein.

DETAILED DESCRIPTION OF PREFERRED EMBODIMENTS OF THE INVENTION

Figure 6:
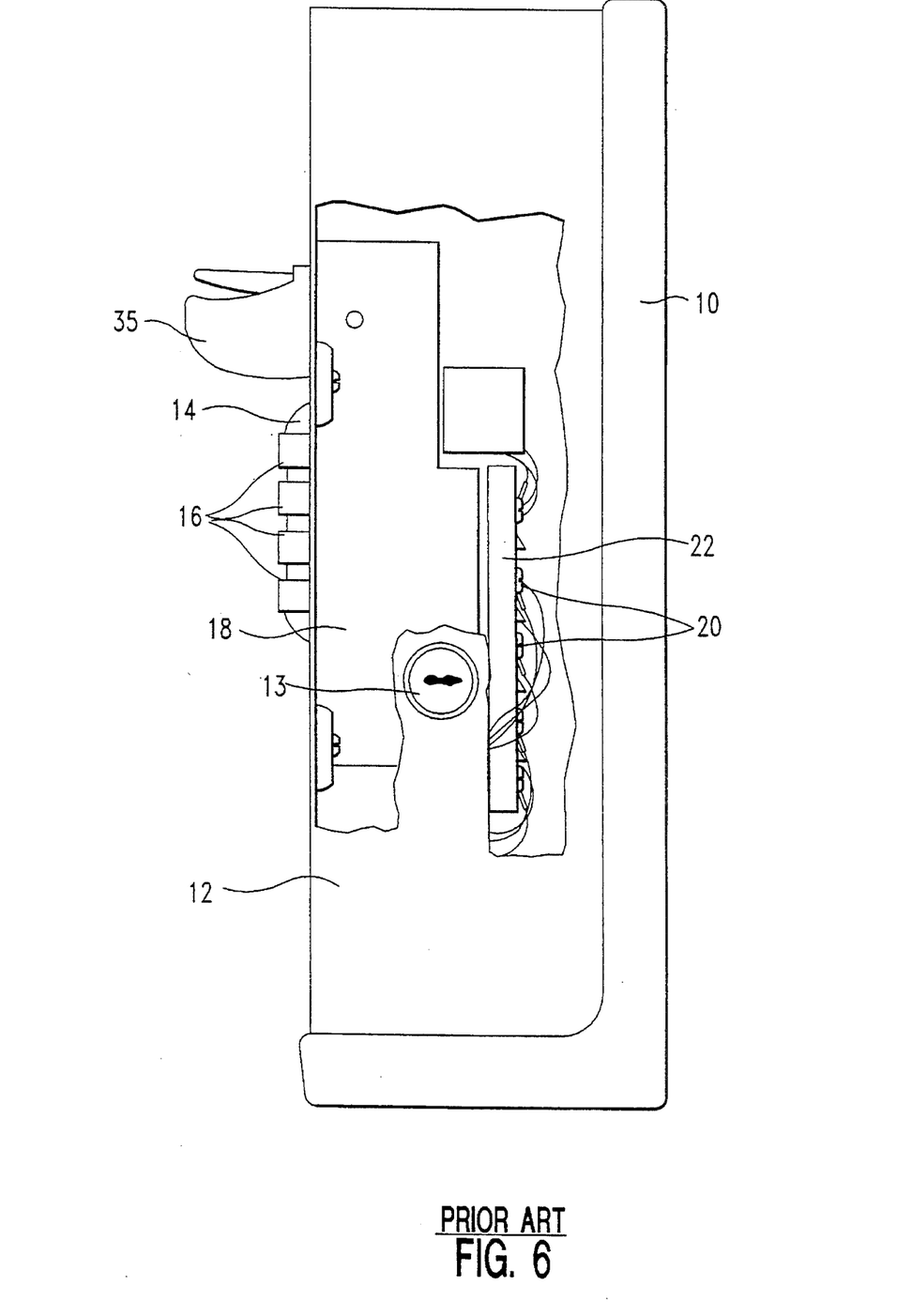
FIG. 6 is a side view of the upper portion of a standard coin-operated telephone, with the upper housing or casing partially broken away, and showing among other things the dial keys, the key pad supporting the dial keys, and the terminal pad mounted on the back of the key pad.

Referring now more particularly to the drawings, FIG. 6 shows the upper portion of a standard coin-operated pay telephone having a main frame 10 and an upper housing or casing 12. On the upper part of its front face, the housing or casing 12 has a twelve-hole grid embossment 14 for receiving and guiding the twelve dial keys or push buttons 16 of a telephone. A switch pad 18 supporting the dial keys 16 is mounted behind the grid embossment 14 and suitably connected by electrical wiring to terminals 20 on a terminal pad 22 mounted behind it and suitably connected by electrical wiring to a coin-switch relay (not shown).

The coin-switch of the coin-switch relay has three different positions that it assumes depending on the energized state of the relay: in the closed position its vane holds up coins deposited by a telephone user; in one open position its vane directs coins deposited to the coin box 24 (FIG. 4), as when a call is completed; and in the other open position its vane directs coins deposited to the coin return mechanism or bucket 26 (FIG. 5), as when a call is not completed. As explained in our copending patent application "Terminal Guard" filed Apr. 22, 1994 under Ser. No. 08/231,500, the wiring between the terminal pad 22 and the coin-switch relay is such that when either of two particular terminals 20 on the terminal pad is grounded as by a bare electrically-conductive wire connected to the telephone casing, the coin switch goes to closed position and causes its vane to hold up all coins inserted. A vandal can insert a bare electrically-conductive wire through a hole drilled in the upper casing.

A vandal can also drill an appropriately located hole through the front or a side of the upper housing or casing 12 to insert a wire therethrough and into the path of the coin-switch vane to block its movement and prevent direction of deposited coins to either the coin box 24 or the coin-return bucket 26. The coin-switch is thus pinned in closed position.

Vandals rip out the grid embossment 14 to get inside the upper casing 12 to effectuate another form of vandalism.

Drilling of the front of the telephone upper hosing or casing to extend a wire through the drilled hole to pin the coin-switch vane, and ripping out of the grid embossment 14, is prevented by a unique two-layer face plate or assemblage generally indicated by the numeral 30 (FIGS. 1–5). Its outer layer or first plate 32 is suitably apertured to provide a second grid 34 for the twelve dial keys 16. It also has appropriate openings for the conventional receiver hanger 35, the information pads 36 and 38 above the hanger 35 and below the dial keys, the coin insert slot 40, the coin return bucket 26, etc. The outer layer is formed of a tough material such as stainless steel or the like to preclude vandal drilling through the front of the casing 12. Its strength is also such as to preclude vandal ripping out of its grid 34 and the embossed grid 14 in the telephone upper casing 12.

To preclude vandal drilling of the upper casing 12 in the areas left open in the outer plate 32 for the information pads 36 and 38, an inner or second plate 42 is mounted between the outer plate 32 and the upper housing or casing 12. The inner plate 42 is generally rectangular and provided about its periphery with apertures by which it is slidably received on threaded studs 43 fixed to the interior of the outer plate 32 and that extend through suitable openings in the front wall of the upper housing or casing 12 to be bolted therebehind to secure the double face plate 30 in place. Additionally, the outer face plate 32 may be welded at several points to the casing 12.

The inner plate 42 completes precluding vandal drilling through the front of the upper housing or casing 12 by being formed of solid portions 44 and 46 in the areas for the information plates 36 and 38, respectively. A large opening 48 in the middle, leaving left and right hand side strips 50 and 52, accommodates the dial keys 16 and the receiver hanger 35. Information plates 36 and 38 would be mounted, in the usual fashion, through the openings in the outer plate 32 on the inner plate 42, yet drilling therethrough of the inner housing or casing 12 by vandals would be precluded by the inner plate 42.

the outer layer 32 can be provided with rearwardly extending left and right sides or wings 54 and 56 respectively and top 58 to wrap partially around the sides and top of the telephone upper casing 12 to preclude drilling of the casing which would enable wires inserted through the drilled hole to pin the coin switch or reach a relay grounding terminal 20. The rear edges of the wings may be appropriately welded to the casing 12 to preclude jimmying.

Figure 1:
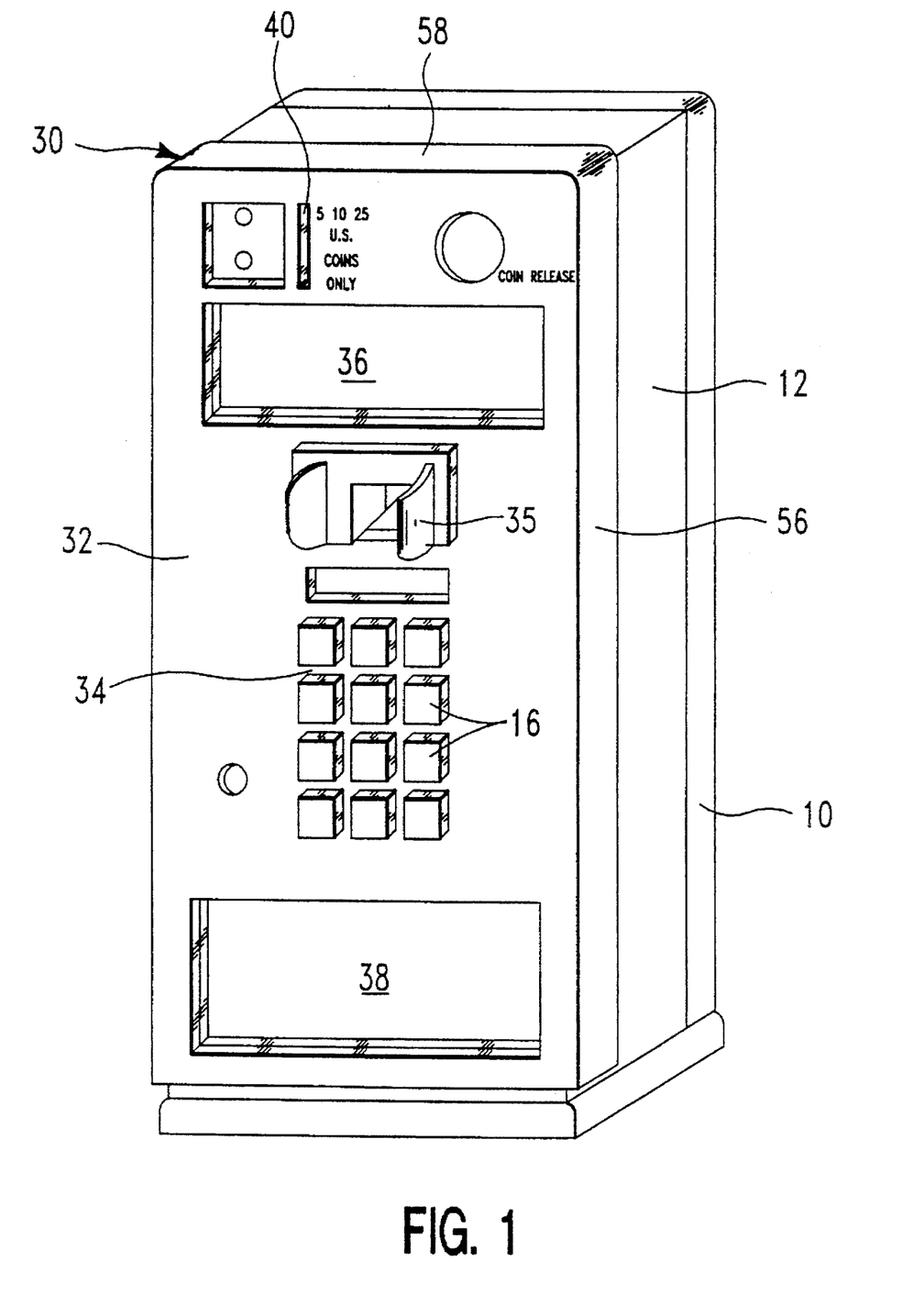
FIG. 1 is a view in perspective of the upper portion of a standard coin-operated pay telephone having its upper housing or casing modified, according to the invention, with a double-face plate or assemblage having side wings and a top.
Figure 2:
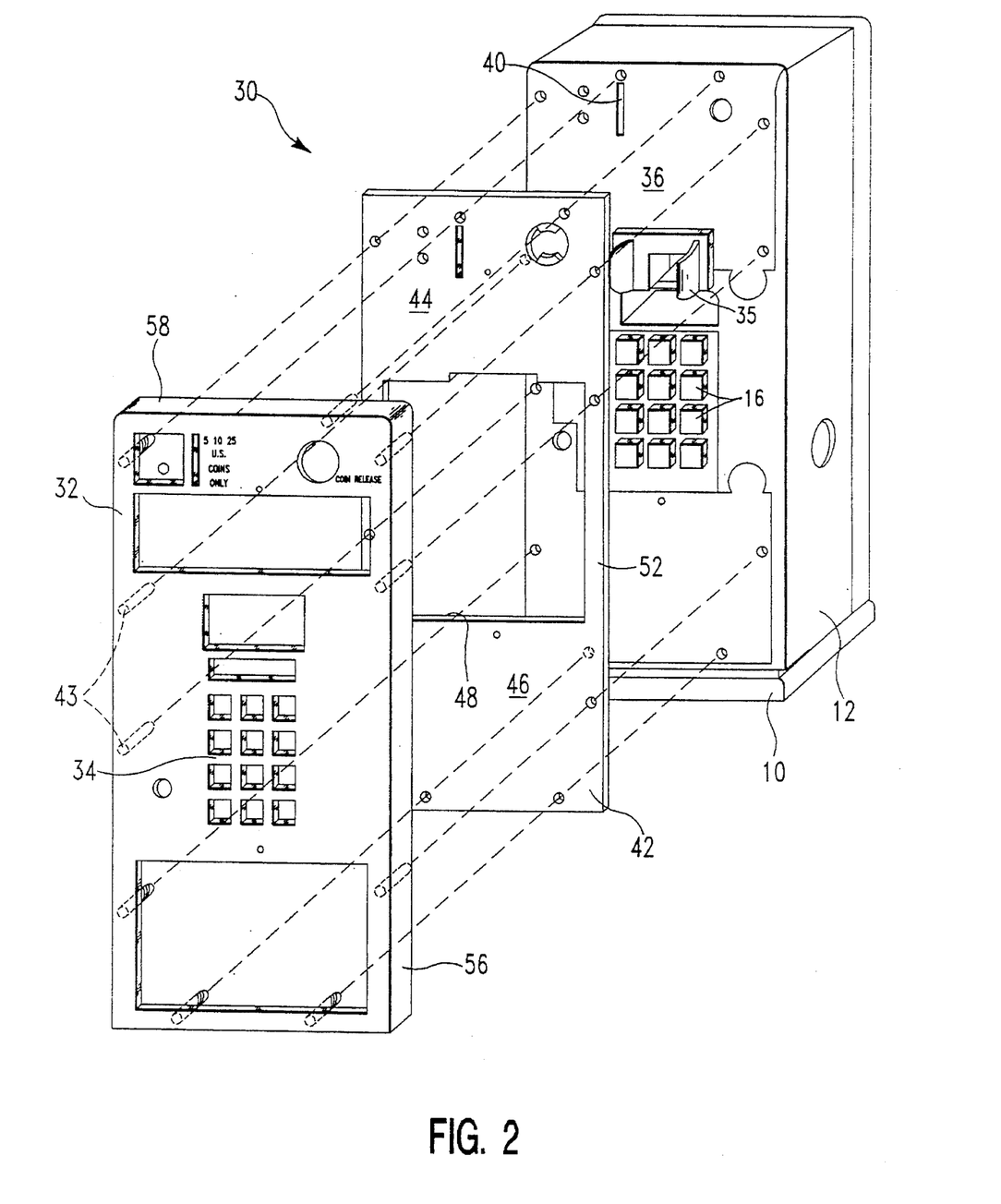
FIG. 2 is an exploded view of the telephone of FIG. 1.
Figure 3:
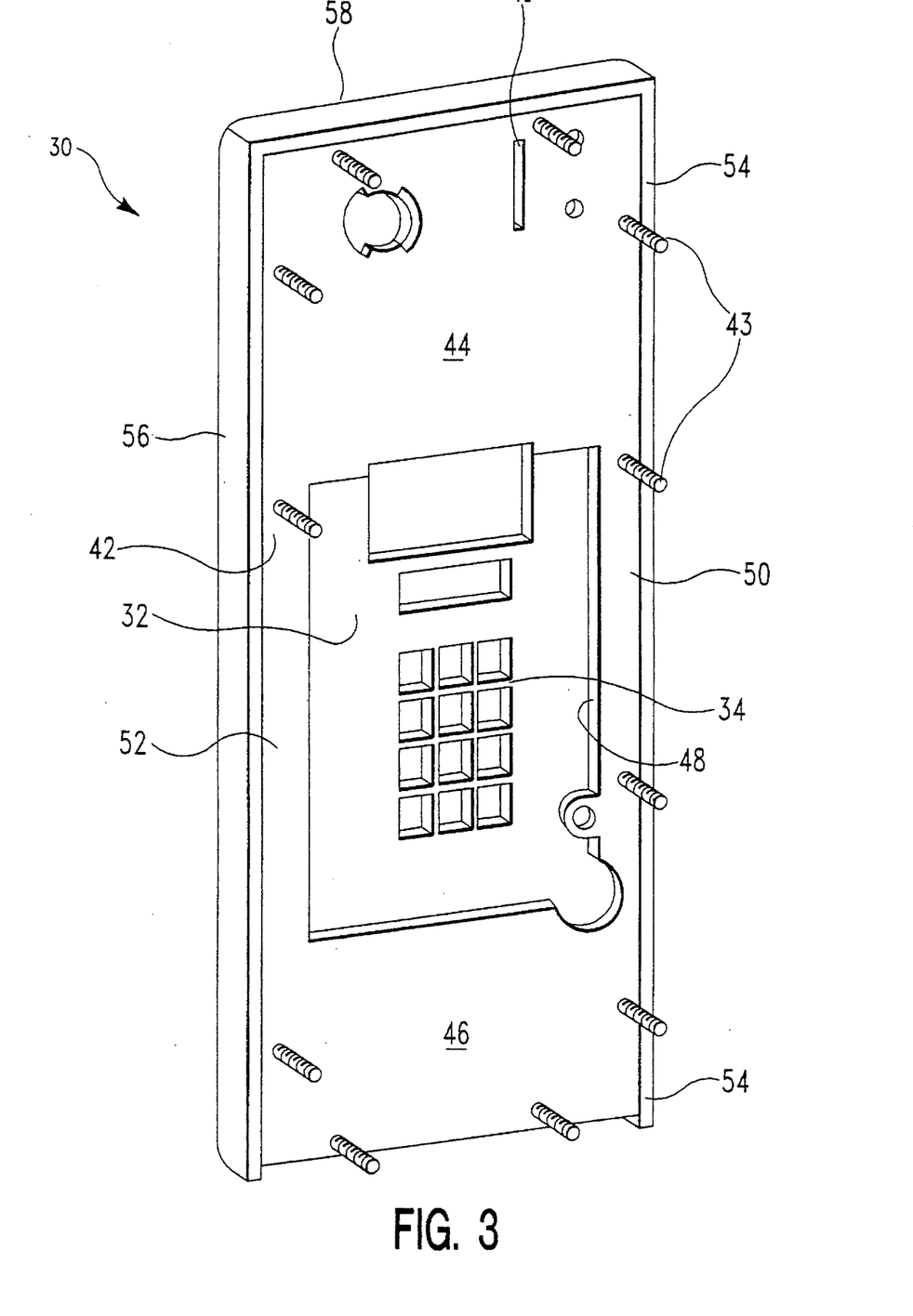
FIG. 3 is a view in perspective of the inside of the double-face plate or assemblage of FIGS. 1 and 2.
Figure 4:
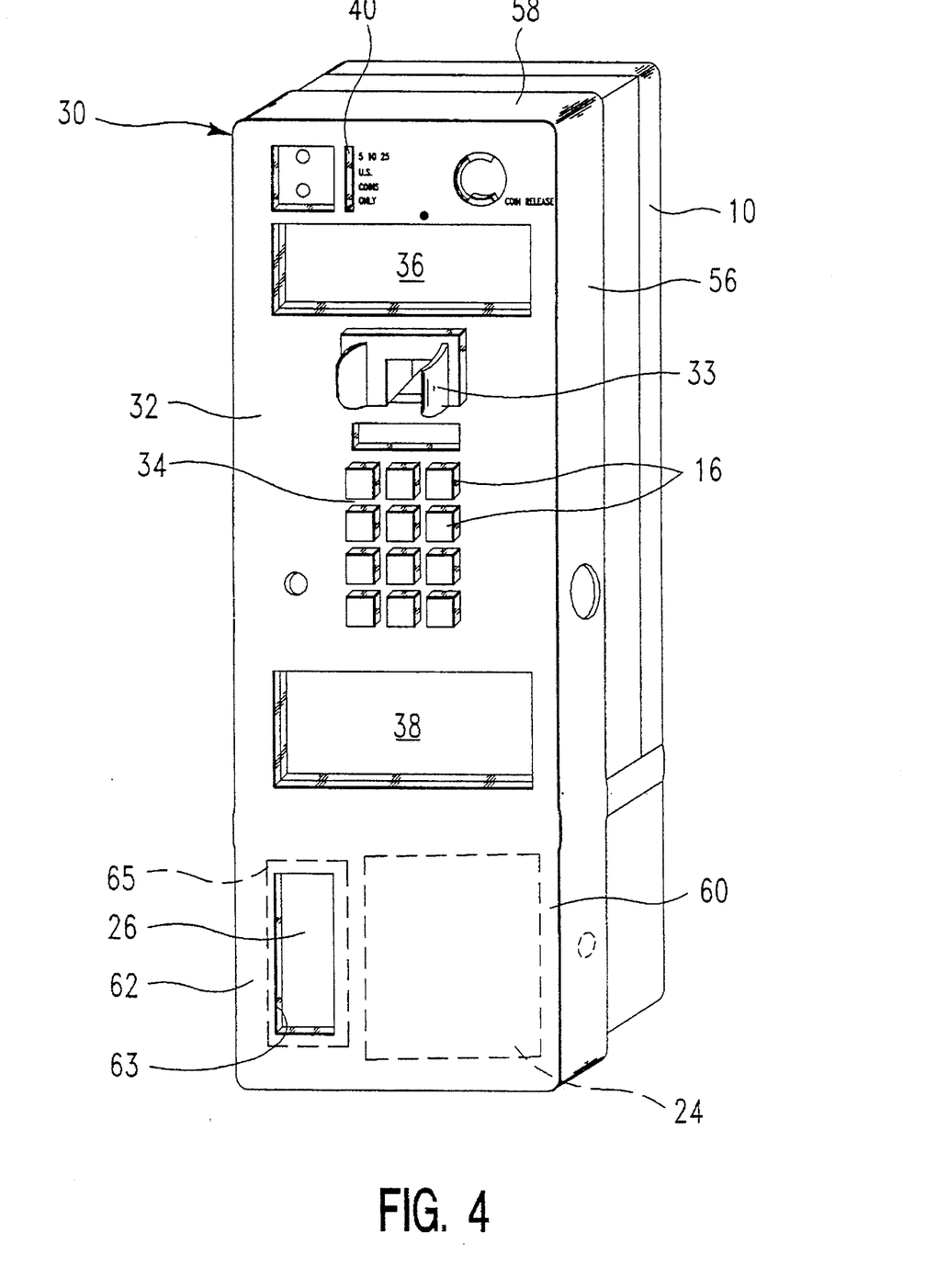
FIG. 4 is a view in perspective of the a whole coin-operated pay telephone showing a double-face plate or assemblage having downwardly extending portions covering the coin box and the coin return bucket.
Figure 5:
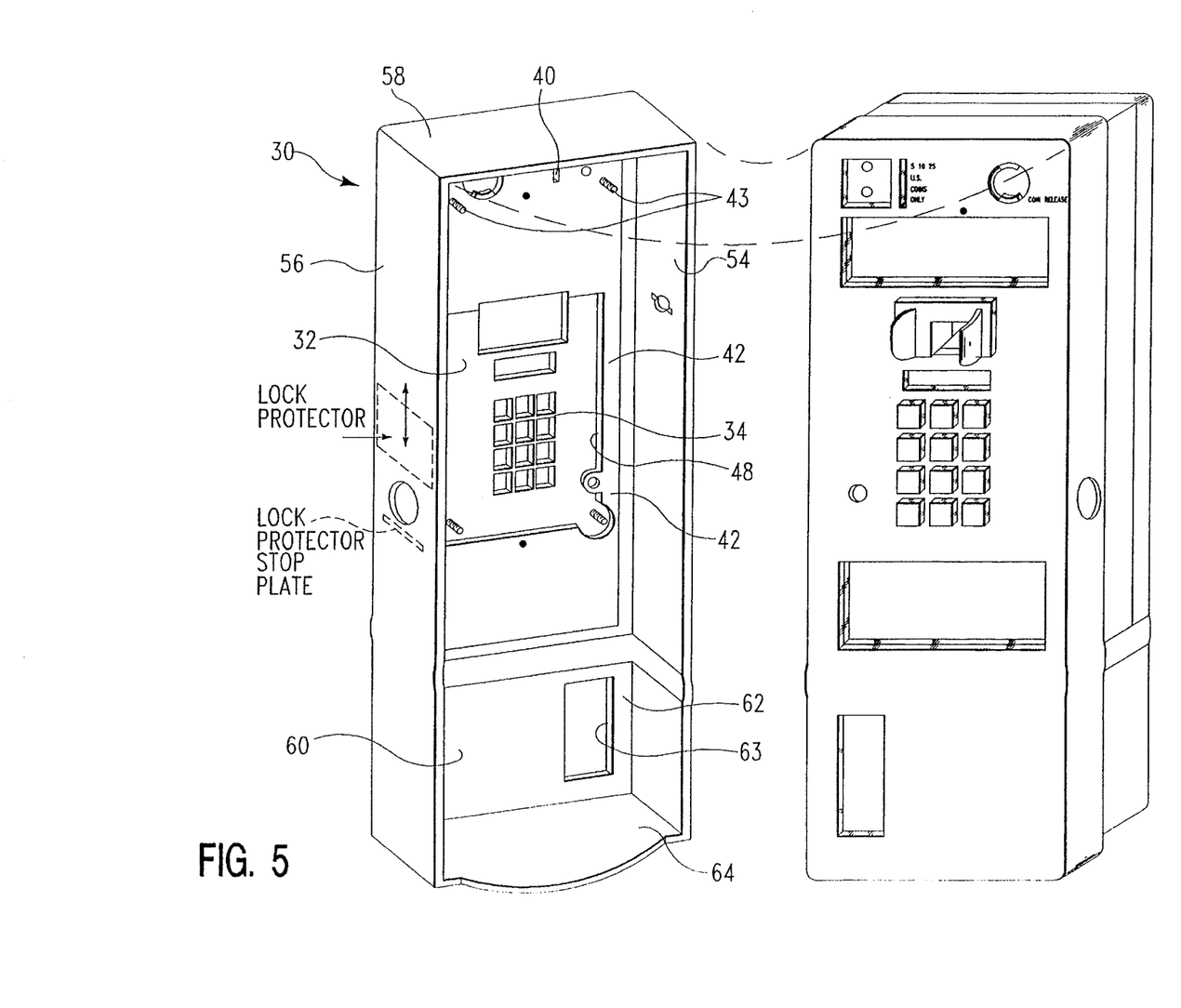
FIG. 5 is an inside view in perspective of the double-face plate of FIG. 4 and showing a rearwardly extending portion of the free ends of the downwardly extending portions and constituting a stand for a removed upper housing and attached assemblage.

As best shown in FIGS. 4 and 5, the outer layer 32 can also be provided with a downwardly extending right hand portion 60 which overlaps the coin box 24, and precludes its being pried off by a sharp tool inserted between it and the main frame 10 or drilled for the insertion of a liquid explosive. The coin bank lock is also covered and hence protected from the weather too.

And as also shown in FIGS. 4 and 5, the outer layer 32 can also be provided with a downwardly extending left hand portion 62 which overlaps the coin return mechanism or bucket 26. The left hand portion 62 is formed with a slot 63 which is no larger than the opening in the bucket 26 so that parts of the portion 62 overlap the lip of the bucket 26. In this way, any vandal effort to rip out the bucket as by a crowbar inserted into the bucket 26 and fulcrumed about the lower edge of the bucket opening is thwarted by the outer edges 65 of the bucket engaging behind the outer plate portion 62 and being held in place thereby.

The outer plate lower portions 60 and 62 may be made in one piece as is shown in the drawings. Wings 54 and 56 may be extended downward as rearward extensions of the lower portions 60 and 62. A plate 64 may extend rearwardly from the bottom of the outer plate 32 to perfect a stand when the upper casing 12 and double face plate 30 are removed as a unit from the main frame 10 of the coin-operated pay telephone installation. The stand plate 64 may extend beyond the wings 54 and 56 to broaden its effective base, and its rearward edge may be circular to eliminate exposed sharp corners which might cause injury or damage.

While there have shown and described preferred embodiments of the invention, it will be apparent to those skilled in the art that other and different applications may be made of the principles of the invention. Accordingly, it is intended to be limited only by the scope or spirit of the appended claims.

What is claimed is:

1. A coin-operated pay telephone having an information pad and instrumentalities including a coin relay movable between coin return and coin collect positions and secured against vandalism involving drilling of a small hole through the information pad and insertion of a wire therethrough to pin the relay in the coin return position, comprising:

a main frame, a housing or casing for protecting the instrumentalities of the telephone and having a flat front face normally mounting the information pad, a first plate secured across the housing flat front face to protect additionally said instrumentalities of the telephone and having an opening for mounting the information pad, and a second plate mounted behind the first plate and having a portion extending directly behind said opening in the first plate to protect additionally said instrumentalities by preventing drilling of a small hole through the information pad and the insertion of a wire therethrough to pin the relay in the coin return position.

2. A pay telephone according to claim 1, wherein the housing or casing flat front face normally mounts a second information pad, the first plate has a second opening for mounting the the second information pad, and the second plate has a portion extending behind said first plate second opening to protect additionally said instrumentalities of the telephone.

3. A pay telephone according to claim 1, wherein the housing or casing is formed with a set of apertures and the interior of the first plate fixedly mounts a set of complementary studs projecting rearwardly, and the second plate is provided with complementary apertures by which it is mounted on said first plate.

4. A pay telephone according to claim 3, wherein the first plate studs are threaded and receive nuts behind the casing to hold the first and second plates onto the casing.

5. A pay telephone according to claim 2, wherein the second plate is generally open in other areas behind the first plate.

6. A pay telephone according to claim 1, wherein dial push buttons project through the casing flat front face and the housing or casing face has a grid through which the dial push buttons extend forwardly, and the first plate is formed with a complementary grid overlying the housing or casing grid.

7. A pay telephone according to claim 6, wherein the second plate is open in the area of the housing or casing and first plate grids.

8. A pay telephone according to claim 7, wherein the housing or casing grid is embossed, and second plate is of a thickness sufficient to eliminate the need for embossing the first plate grid.

9. A pay telephone according to claim 1, wherein one of said first and second plates is formed with wings which extend rearwardly along the sides of the housing or casing.

10. A pay telephone according to claim 9, wherein said one of said first and second plates is also formed with a top which extends rearwardly over the top of the housing or casing.

11. A pay telephone according to claim 9, wherein said one of said first and second plates is the outer plate, and the free ends of the wings are welded to the housing or casing.

12. A pay telephone according to claim 1, wherein the main frame has a coin box in its lower portion removable from the front on unlocking, and the first plate has a depending portion which overlies the coin box to preclude it from being pried out.

13. A pay telephone according to claim 1, wherein the main frame has a coin return bucket in its lower portion normally not removable from the front, and the first plate has a depending portion which overlies portions of the coin return bucket to preclude it from being ripped out.

14. A pay telephone according to claim 12, wherein the main frame also has a coin return bucket in its lower portion normally not removable from the front, and the first plate has a depending portion which overlies portions of the coin return bucket to preclude it from being ripped out, the two first plate depending portions being integral with one another.

15. A pay telephone according to claim 14, wherein the first plate and its depending portions are formed with wings which extend rearwardly along the sides of the housing or casing and the bottom portion of the main frame.

16. A pay telephone according to claim 14, wherein the lower end of the depending portions of the first plate are formed with a rearwardly projecting portion serving as a stand when the housing or casing and the attached plates are unlocked from the main frame and stood on soft ground.

17. A pay telephone according to claim 9, wherein the upper housing or casing is provided with a lock in one of its sides for securing it to the main frame, and the wing on that side is formed with an opening for providing access to that lock.

18. A pay telephone according to claim 8, wherein said upper housing or casing is provided with a lock in one of its sides for securing it to the main frame, said first plate is formed with wings which extend rearwardly along the sides of the housing or casing and the one on the housing or casing side with the lock has an opening overlying said lock, said main from has in its lower portion a coin box normally removable from the front on unlocking and a coin return bucket normally not removable from the front, the first plate has depending portions which overlie the coin box and portions of the coin return buckets, and a plate extends rearwardly from the bottom of the depending portions and beyond the wings to form a stand and to where it terminates in a circular edge.

19. A double face plate assemblage for securing a pay telephone having an information pad and dial push buttons on the front of an upper housing or casing, and therebehind a coin relay movable between coin deposit and coin return positions, against vandalism including drilling a small hole through the information pad and the insertion of a wire through the housing behind the information pad to pin the relay in the coin return position, by reinforcing its upper housing or casing, comprising:

a first plate of a tough material having an opening for an information pad and a grid for receiving said dial push buttons, and a second plate of a tough material behind said first plate and having
 a portion extending directly behind said first plate opening to prevent drilling of a small hole in the housing behind the information pad and the insertion of a wire through the hole to pin the relay in the coin return position
 and an opening behind said first plate grid, and structure for mounting the second plate on the first plate.

20. A double face plate assemblage according to claim 19, wherein the first plate bears wings at its outer edges for extending rearwardly along the sides of the upper casing.

21. A double face plate assemblage according to claim 20 and the telephone also has a main frame having in its lower portions a coin box and a coin return bucket, wherein the first plate has depending portions for overlying the coin box and the coin return bucket.

* * * * *